(12) United States Patent
Takashima et al.

(10) Patent No.: US 12,468,313 B2
(45) Date of Patent: Nov. 11, 2025

(54) MOVING OBJECT OPERATION MANAGEMENT DEVICE

(71) Applicant: TOYOTA JIDOSHA KABUSHIKI KAISHA, Toyota (JP)

(72) Inventors: Toru Takashima, Susono (JP); Keigo Noguchi, Toyota (JP); Atsushi Tojo, Susono (JP); Shun Maruyama, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 18/659,029

(22) Filed: May 9, 2024

(65) Prior Publication Data
US 2025/0068180 A1 Feb. 27, 2025

(30) Foreign Application Priority Data
Aug. 23, 2023 (JP) ................. 2023-135748

(51) Int. Cl.
*G05D 1/644* (2024.01)
*G05D 1/693* (2024.01)
(Continued)

(52) U.S. Cl.
CPC ............. *G05D 1/644* (2024.01); *G05D 1/693* (2024.01); *G05D 2105/20* (2024.01); *G05D 2105/28* (2024.01); *G05D 2107/70* (2024.01)

(58) Field of Classification Search
CPC ...... G05D 1/644; G05D 1/693; G05D 1/6987; G05D 1/246; G05D 1/43; G05D 1/648; G05D 2105/20; G05D 2105/28; G05D 2107/70; G05D 2109/10; G08G 1/143; G08G 1/07
See application file for complete search history.

(56) References Cited

FOREIGN PATENT DOCUMENTS

| CN | 107179769 A | * | 9/2017 | ....... G06Q 10/06312 |
| CN | 110989570 A | * | 4/2020 | ........... G05D 1/0242 |

(Continued)

OTHER PUBLICATIONS

Le et al.; Integrating Both Routing and Scheduling Into Motion Planner for Multivehicle System; IEEE Canadian Journal of Electrical and Computer Engineering, vol. 46, No. 1, Winter 2023 (Year: 2023).*

*Primary Examiner* — Michael J Zanelli
(74) *Attorney, Agent, or Firm* — SoraIP, Inc.

(57) ABSTRACT

A moving object operation management device for managing the operation of moving objects that move in a passage provided in an area and perform work at a specific place. When the work of a certain moving object hinders the movement of another moving object in a passage, the exclusive section and the exclusive section for one of the two moving objects are adjacent to each other, and when the movement of the shortest path to the next destination is hindered by the other exclusive section, the first operation instruction for moving one to the next exclusive section and after the exclusive section of the other section is released. And a second operation instruction to move the one moving object to the next destination by the shortest path, by comparing the arrival time to the one of the next destination in accordance with the instructions, configured to selectively emit.

5 Claims, 5 Drawing Sheets

(51) Int. Cl.
    *G05D 105/20*    (2024.01)
    *G05D 105/28*    (2024.01)
    *G05D 107/70*    (2024.01)

(56) References Cited

FOREIGN PATENT DOCUMENTS

| | | | | |
|---|---|---|---|---|
| JP | 2000330633 | A * | 11/2000 | |
| JP | 2004252631 | A * | 9/2004 | |
| JP | 4138541 | B2 * | 8/2008 | ........... G05D 1/0289 |
| JP | 2021-178533 | A | 11/2021 | |
| WO | WO-2024195482 | A1 * | 9/2024 | ............... G08G 1/00 |

* cited by examiner

MOVING OBJECT OPERATION MANAGEMENT DEVICE

CROSS-REFERENCE TO RELATED APPLICATION

This application claims priority to Japanese Patent Application No. 2023-135748 filed on Aug. 23, 2023, incorporated herein by reference in its entirety.

BACKGROUND

1. Technical Field

The present disclosure relates to devices for managing the operation of a plurality of moving objects configured to move in a passage provided in an area and perform work at a specific place.

2. Description of Related Art

Regarding a system for managing the operation of a plurality of moving objects, there is a technique described in Japanese Unexamined Patent Application Publication No. 2021-178533 (JP 2021-178533 A). This technique relates to ground support work using a plurality of moving objects in an airport. In this support work, the travel path of each moving object is set so that the moving object does not interfere with the other moving objects.

SUMMARY

The technique described in JP 2021-178533 A is a technique of relatively freely setting travel paths in an area where no passage is set. This technique is therefore not suitable for managing the operation of moving objects in an area where a passage in which moving objects are supposed to travel is set in advance. Moving object operation management devices will become more practical if the operation of moving objects can be appropriately managed in an area where a passage is set in advance. The present disclosure was made in view of the above circumstances, and it is an object of the present disclosure to provide a highly practical moving object operation management device.

In order to solve the above problem, a moving object operation management device of the present disclosure manages operation of a plurality of moving objects configured to move in a passage provided in an area and perform work at a specific place. The moving object operation management device is configured to when the work of a certain moving object hinders movement of another moving object in the passage, set a section including the place where the work is performed as an exclusive section, and when the exclusive section for one of two moving objects and the exclusive section for the other moving object are adjacent to each other and movement of the one moving object to a next destination by a shortest path is hindered by the exclusive section for the other moving object, selectively generate a first operation instruction and a second operation instruction by comparing an arrival time of the one moving object at the next destination between the first operation instruction and the second operation instruction, the first operation instruction being an instruction to move the one moving object to the next destination by a path bypassing the exclusive section for the other moving object, and the second operation instruction being an instruction to move the one moving object to the next destination by the shortest path after the exclusive section for the other moving object is cancelled.

The second operation instruction is an instruction to cause the one moving object to wait in the exclusive section for the one moving object, and move to the next destination by the shortest path after the other moving object moves toward a next destination without passing through the exclusive section for the one moving object.

In short, according to the moving object operation management device of the present disclosure, for example, a travel path can be determined according to which of the following allows the moving object to arrive at the next destination faster: taking the detour path, or taking the shortest path after the work of the other moving object is finished. This configuration allows quick operation of the moving objects even when there are adjacent exclusive sections.

The present disclosure is premised on a moving object operation management device that manages operation of a plurality of moving objects configured to move in a passage provided in an area and perform work at a specific place. The moving object operation management device is configured to when the work of a certain moving object hinders movement of another moving object in the passage, set a section including the place where the work is performed as an exclusive section, and when the exclusive section for one of two moving objects and the exclusive section for the other moving object are adjacent to each other and movement of the one moving object to a next destination by a shortest path is hindered by the exclusive section for the other moving object, selectively generate a first operation instruction and a second operation instruction by comparing an arrival time of the one moving object at the next destination between the first operation instruction and the second operation instruction, the first operation instruction being an instruction to move the one moving object to the next destination by a path bypassing the exclusive section for the other moving object, and the second operation instruction being an instruction to move the one moving object to the next destination by the shortest path after the exclusive section for the other moving object is cancelled.

The moving objects that are managed by the moving object operation management device (hereinafter sometimes simply referred to as "management device") of the present disclosure are not particularly limited, and include various moving objects such as vehicles, heavy machines, transport devices, and drones. The present disclosure is applicable to moving objects that move in various areas such as a warehouse, a business office, and a town. Specifically, the present disclosure may be applied to vehicles that move in towns to transport people and objects, or may be applied to transport vehicles that load and unload articles into and from a warehouse. The work that is performed by the moving objects is not particularly limited, and may vary from moving object to moving object.

The passage in which the moving objects move may be such a passage that the moving objects cannot pass each other. However, in view of ease of operation management and smoothness of movement of the moving objects, it is desirable to allow the moving objects to move only on one side of the passage, namely on the right or left side of the passage, in the direction of movement so as to allow the moving objects to pass each other.

The "work of a certain moving object hinders movement of another moving object in the passage" means, for example, a situation in which the work of the moving object is such work that causes the moving vehicle to block the passage or to protrude into the passage, etc. and the work of the moving object interferes with another moving object. In short, the work for which the exclusive section is set can be considered to be such work that causes the moving object to occupy the passage.

The moving objects may be moved automatically, that is, driven automatically, or may be driven by human drivers. In the case where the moving objects are driven automatically, the moving objects may be driven automatically based on instructions from the management device. In the case where the moving objects are driven by human drivers, the instructions from the management device may be displayed on, for example, a display so that the drivers can recognize the instructions.

When the work of a certain moving object hinders movement of another moving object in the passage, the management device sets an exclusive section for the certain moving object. In short, for example, the exclusive section may be set when the work is started. Setting of the exclusive section may be cancelled when the work is finished or when the moving object finishes the work and is switched to an attitude in which the moving object is ready to move to the next destination.

In short, the basic concept of the present disclosure is to select one of the following two options when two moving objects are working in adjacent places and one of the moving objects has finished the work but the other moving object is still working: take a detour path bypassing the place where the other moving object is working, and wait for the other moving object to finish the work and take the shortest path. The instruction that is sent to the one moving object when the former option is selected is the first operation instruction, and the instruction that is sent to the one moving object when the latter option is selected is the second operation instruction. The first operation instruction and the second operation instruction may be sent to the one moving object as soon as the work in the exclusive section for the one moving object is finished. When movement of the one moving object to the next destination by the shortest path is not hindered by the exclusive section for the other moving object, an instruction to move the one moving object to the next destination by the shortest path may be sent to the one moving object.

When the second operation instruction is generated according to the above basic concept, the second operation instruction includes, for example, the following two types of instructions regarding the action of the one moving object: an "instruction to cause the one moving object to wait in the exclusive section for the one moving object," and an "instruction to cause the one moving object to retreat into a nearby retreat space," namely, "standby instruction" and "retreat instruction." Although the second operation instruction in the present disclosure is the "standby instruction," description will be given below for each of the two instructions.

When the second operation instruction is the standby instruction, the second operation instruction is an instruction to cause one of the two moving objects to wait in the exclusive section for the one moving object, and move to the next destination by the shortest path after the other moving object moves toward a next destination without passing through the exclusive section for the one moving object.

When the second operation instruction that is the standby instruction is sent to one of the two moving objects, the management device may send the following instruction to the other moving object. For example, when movement of the other moving object to the next destination by the shortest path is not hindered by the exclusive section for the one moving object, the management device may send to the other moving object an instruction to move the other moving object to the next destination by the shortest path. For example, when movement of the other moving object to the next destination by the shortest path is hindered by the exclusive section for the one moving object, the management device may send to the other moving object an instruction to move the other moving object to the next destination by bypassing the exclusive section for the one moving object. The latter indication is effective in a situation where movement of the one moving object by the shortest path and movement of the other moving object by the shortest path are hindered by each other, i.e., in a situation where a deadlock occurs.

When the second operation instruction is the retreat instruction, the second operation instruction is as follows. When movement of the other moving object to the next destination by the shortest path is hindered by the exclusive section for one of two moving objects, the second operation instruction is an instruction to cause the one moving object to retreat into a nearby retreat space so that the exclusive section for the one moving object is cancelled, and move the one moving object to the next destination by the shortest path after the other moving object passes through the cancelled exclusive section and moves toward the next destination by the shortest path. This second operation instruction is also effective in a situation where a deadlock occurs between the two moving objects. The retreat space is a space where a moving object can stay without hindering movement of another moving object in the passage.

When there is no retreat space, the management device may selectively generate, for example, the first operation instruction and a third operation instruction by comparing the arrival time of one of the two moving objects at the next destination between these operation instructions. The third operation instruction is an alternative to the second operation instruction, and is an instruction to cause one of the two moving objects to wait in the exclusive section for the one moving object, move the other moving object to the next destination by bypassing the exclusive section for the one moving object, and then move the one moving object to the next destination by the shortest path. The instruction thus selectively generated is also effective in a situation where a deadlock occurs between the two moving objects.

Selection between the first operation instruction and the second operation instruction is made by comparing the arrival time of one of two moving objects at the next destination between these instructions. More specifically, selection between the first operation instruction and the second operation instruction is made by comparing the arrival time at the next destination when the moving object moves to this destination by the detour path (hereinafter sometimes referred to as "first arrival time") and the arrival time at the next destination when the moving object moves to this destination by the shortest path after waiting or retreating (hereinafter sometimes referred to as "second arrival time").

The first arrival time and the second arrival time may be calculated by, for example, Dijkstra's algorithm in graph theory. Specifically, a graph may be created in which nodes (vertexes) and sides (edges) connecting the nodes according to the passage are set at main points such as branch points of the passage and the work places (exclusive sections) and next destinations of both of the two moving objects. The first arrival time and the second arrival time may be calculated by selecting the shortest path from the paths between the work place and next destination of the one moving object. The first arrival time may be calculated using a graph in which the edges connecting the work places of the two moving objects are eliminated, and the second arrival time may be calculated by adding the wait or retreat time to the time required to move by the shortest path. In other words, the end time when the other moving object finishes the work in the exclusive section for the other moving object may be estimated, and the second arrival time may be calculated in consideration of the estimated end time.

In principle, when selecting one of the first and second operation instructions, the instruction corresponding to the earlier one of the first and second arrival times may be selected. However, it is not necessarily necessary to follow the principle. For example, a margin of time may be added to or subtracted from either the first arrival time or the second arrival time in consideration of factors such as traffic congestions, conditions of the passage, and fuel consumption, and the instruction corresponding to the earlier one of the resultant first and second arrival times may be selected.

For example, there may be a case where there is a moving object other than the two moving objects (hereinafter sometimes referred to as "third moving object") in the area and the third moving object hinders movement of one of the two moving objects to the next destination. However, in order to facilitate understanding of the concept of the present disclosure, such hindering of movement by the third moving object will not be considered in the following description.

The hardware configuration of the moving object operation management device is not particularly limited, and the moving object operation management device need only include, for example, a computer and a communication device. A storage area of the computer need only be configured to store, for example, a map related to a passage in which the moving objects move, a current location of each moving object, and a work schedule of each moving object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a moving object operation management device according to an embodiment of the present disclosure will be described in detail with reference to the drawings as embodiments for carrying out the present disclosure. In addition to the following embodiment, the disclosure can be carried out in various forms including the forms described in the above section "SUMMARY" and various modified or improved forms that are made based on the knowledge of those skilled in the art.

A. Vehicle Warehouse

Figure 1:
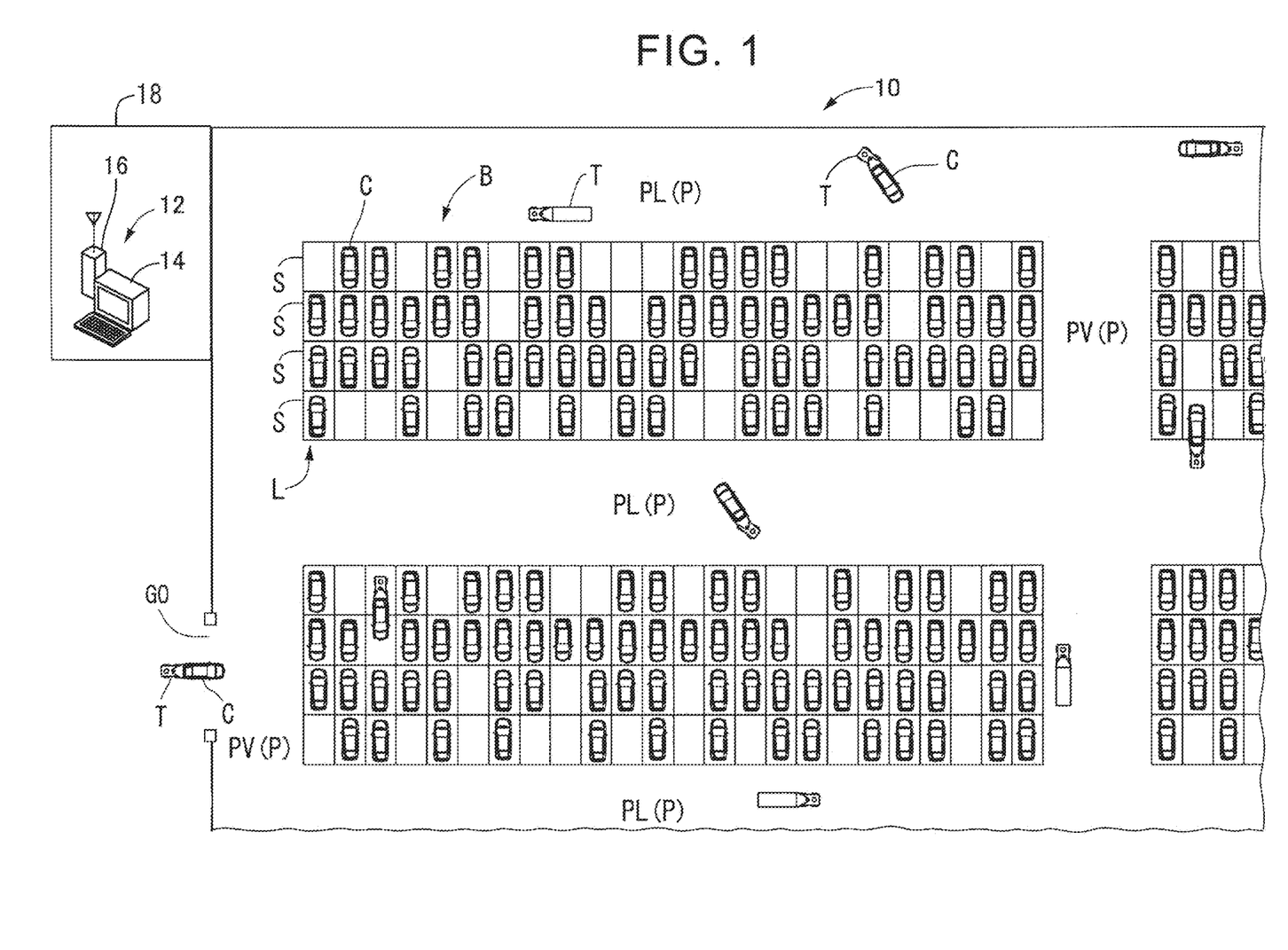
FIG. 1 is a diagram illustrating a vehicle warehouse that is an area in which a vehicle transport device, which is a moving object to be managed by a moving object operation management device according to an embodiment, moves.

The moving object operation management device of the embodiment is a transport device operation management device (hereinafter, may be simply referred to as a "management device") that manages the operation of a vehicle transport device (hereinafter, may be simply referred to as a "transport device") as a moving object. As shown in FIG. 1, the transport machine T moves, i.e., travels, in the warehouse 10 as an area. As will be described in detail later, the transport machine T carries the vehicle C as the transported object into the warehouse 10, stores the transported vehicle C in the storage section S, takes out the vehicle C stored in the storage section S, and carries out the vehicle C to the outside of the warehouse 10.

The storage section S has a length and a width in which one of the vehicles C is just stored, and in the warehouse 10, there are provided several storage blocks B in which a plurality of storage rows L in which four storage sections S are arranged in the length direction are arranged in the width direction. In the warehouse 10, a passage P through which the transport machine T travels is provided so as to surround each storage block B. Specifically, a transverse passage PL extending laterally so as to face the end of the storage row L and a longitudinal passage PV connecting the transverse passage PL are provided. Hereinafter, the transverse passage PL, vertical passage PV may be collectively referred to as a passage P.

At the left end of the warehouse 10 in the drawing, a carry-out port GO for carrying out the vehicle C is provided, and although omitted in the drawing, a carry-in port GI for carrying in the vehicle C is provided at the right end. The management device 12 includes a computer 14 and a communication device 16, and is installed in a management room 18 attached to the warehouse 10.

B. Vehicle Transport

Figure 2A:
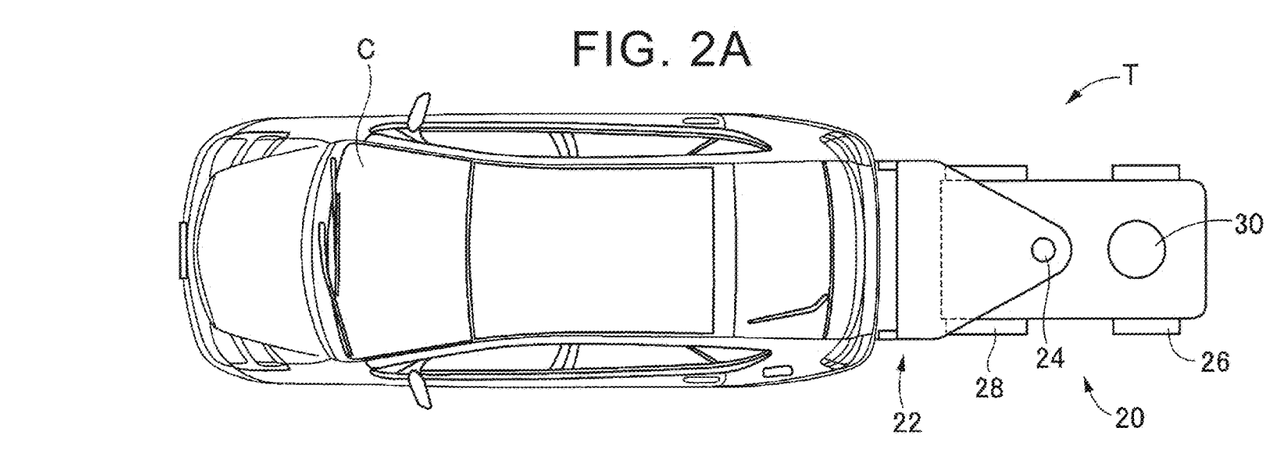
FIG. 2A is a diagram illustrating a vehicle transporting machine.
Figure 2B:
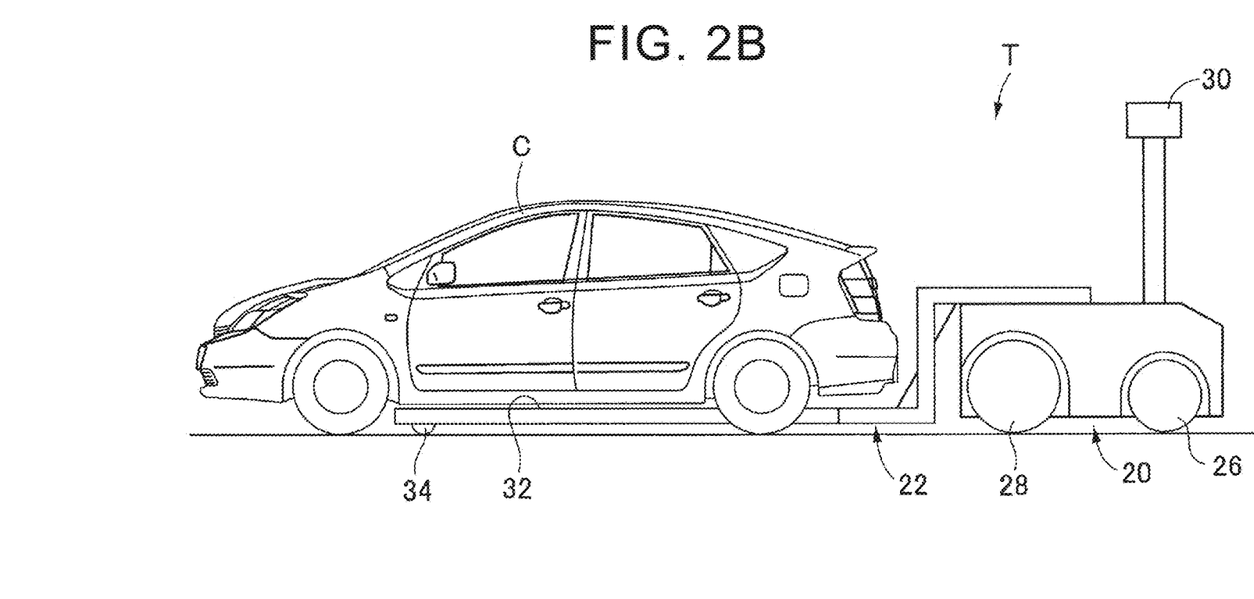
FIG. 2B is another diagram illustrating the vehicle transporting machine.

As shown in a plan view in FIG. 2A and a side view in FIG. 2B, the transport machine T is constituted by a towing vehicle 20 that automatically travels and a carrier 22 that is towed by the towing vehicle 20. The towing vehicle 20 and the carrier 22 are rotatable about a hinge 24. The towing vehicle 20 includes a front wheel 26 and a rear wheel 28, and the front wheel 26 is a steered wheel and the rear wheel 28 is a drive wheel. The towing vehicle 20 incorporates an automatic travel controller for automatic travel. Further, the towing vehicle 20 has a unit device 30 in which a camera for monitoring the surroundings for automatic traveling, a beacon receiver for acquiring its own position, a communication device for communicating with the management device 12, and the like are integrated. Since the automatic traveling is performed by a general method, a description thereof will be omitted. The carrier 22 has a base plate 32 for lifting and lowering, and the lifting and lowering is performed by an automatic traveling controller. The carrier 22 also has wheels 34 at its end remote from the towing vehicle 20.

As shown in FIGS. 2A and 2B, the transport machine T can transport the vehicle C in a state in which the carrier 22 is inserted downward from the rear side of the vehicle C, the base plate 32 is raised, and the vehicle C is lifted. Further, although not shown, it is also possible to carry the vehicle C in a state in which the carrier 22 is inserted downward from the front side of the vehicle C, the base plate 32 is raised, and the vehicle C is lifted. That is, the transport machine T is accessible to the vehicle C in any of the directions of the front side and the rear side of the vehicle C.

C. Functions of the Transport Machine Operation Management System

As described above, the management device 12, which is a moving object operation management device, mainly includes the computer 14, and the computer 14 includes a CPU, a storage device such as a ROM, RAM, hard disk, and the like. The management device 12 has an inventory management function for creating inventory data indicating which vehicle C is currently stored in which storage section S in the warehouse 10. In addition, the management device 12 receives, from the outside, loading/unloading data regarding when and what type of vehicle C is loaded into the warehouse 10 and when and what type of vehicle C is unloaded from the warehouse 10. The management device 12 has a work plan creation function of creating a work plan for the storage/removal work of the vehicle C by the transport machine T based on the carry-in/carry-out data. Although detailed descriptions of the inventory data and the work plan are omitted, they are stored in the storage device of the computer 14.

Further, the management device 12 specifies the storage section S in which the vehicle C to be loaded or unloaded is stored at an appropriate timing based on the inventory data and the loading/unloading data. The management device 12 has a work assignment function of determining which transport machine T is to be caused to perform the storage work of the vehicle C in the storage section S or the take-out work of the vehicle C from the storage section S. Further, the management device 12 grasps at present which transporting machine T is moving while transporting the vehicle C or in a state where the vehicle C is not transported at which position in the warehouse 10, or at which position the storage work or the take-out work is performed. The allocation of the storage work or the take-out work is performed based on the understanding thereof. Then, the management device 12 has an operation instruction generation function to generate an operation instruction to the transport machine T to which work is assigned, which vehicle C is carried into the warehouse 10 and is directed to which storage section S through which passage P, to store the vehicle C in the storage section S, or to take out the vehicle C stored in which storage section S, and to take out the vehicle C from the warehouse 10 through which passage P. In short, it has a function of issuing an operation instruction including the next destination of each transport machine T.

Figure 3A:
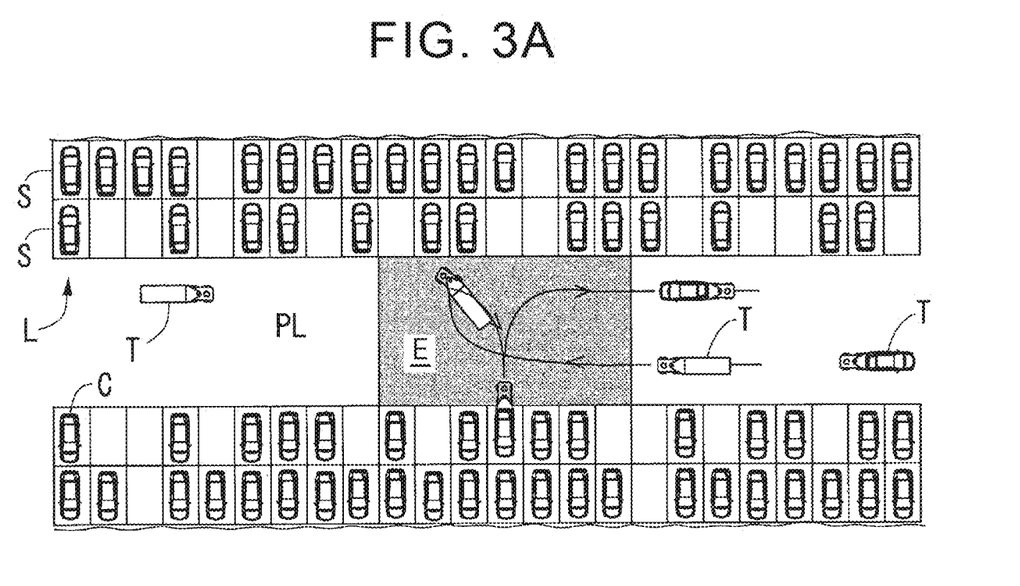
FIG. 3A is a diagram for explaining a state in which work by the vehicle transport machine hinders movement of a passage of another vehicle transport machine.

D. Vehicle Load/Unloading Work and Obstruction of Passage Movement by Vehicle Transportation Machine In the warehouse 10, a storage row L in which four storage sections S are arranged is arranged. Take out of the vehicle C from the storage section S, the storage of the vehicle C into the storage section S, for example, as shown in FIG. 3A, the transport machine T from the transverse passage PL which the end portion of the storage row L faces to the storage row L, from the storage row L It is performed by advancing to the transverse passage PL. The passage P is a left-side passage and has a width that allows the transport machine T to pass through. Since the length of the transport machine T is long regardless of whether or not the vehicle C is being transported, when the load work and the unload work (hereinafter sometimes simply referred to as "work") are performed, the movement of the other transport machine T in the section having the transverse passage PL including the place where the work is being performed is obstructed.

Therefore, the management device 12 sets the above-described section as the exclusive section E and prohibits the movement of the other transport machine T when the transport machine T of 1 is performing the load work and the unload work. Incidentally, the exclusive section E is set so as to be released when the transport machine T performing the work finishes the work and, more specifically, when the transport machine T finishes the work and moves along the transverse passage PL. In the drawings, the exclusive section E is colored in gray.

Figure 3B:
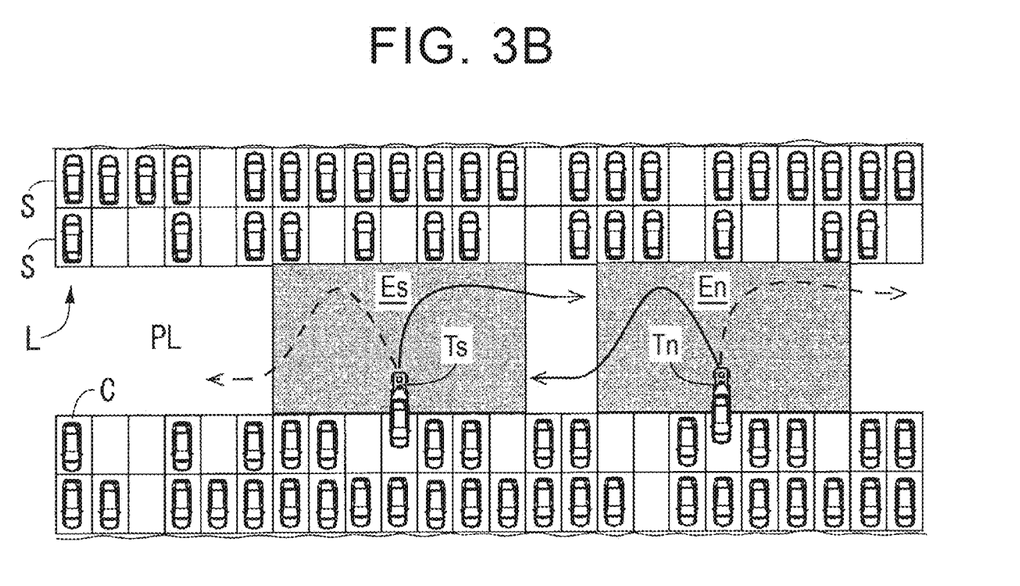
FIG. 3B is a diagram for explaining an exclusive section set in association with the hindrance in FIG. 3A.

However, for example, when two transport machines T perform work in one transverse passage PL and two exclusive sections E are set adjacently to each other as shown in FIG. 3B, a trouble arises. Specifically, in view of the efficiency of the transport machine T, the completed transport machine T should be moved along the shortest path to the next destination for the next work. When the transport machine T (hereinafter, may be referred to as "target transport machine Ts") of 1 that has completed the work goes to the next destination, the exclusive section E (hereinafter, may be referred to as "adjacent exclusive section En") of another transport machine T (hereinafter, may be referred to as "adjacent work transport machine Tn") cannot move along the shortest path indicated by a solid line. In particular, when the adjacent work transport machine Tn finishes the work, the adjacent work transport machine Tn cannot move along the shortest path indicated by the solid line due to the exclusive section E (hereinafter, sometimes referred to as "self-exclusive section Es") for the target transport machine Ts. It also leads to a so-called deadlock situation. In FIG. 3B, the detour paths of the target transport machine Ts, adjacent work transport machine Tn are indicated by broken lines.

E. Response to Adjacent Exclusive Sections

Figure 4:
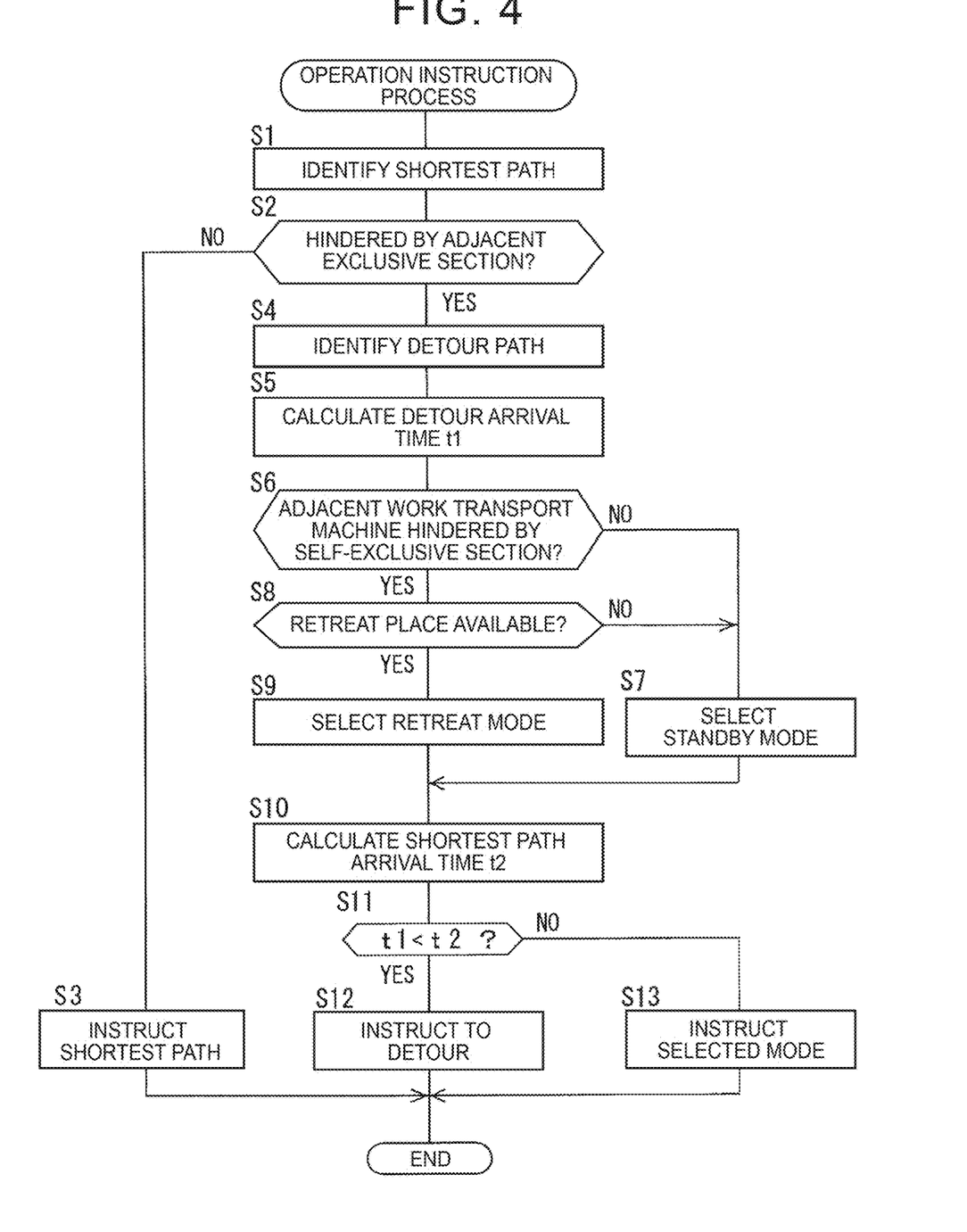
FIG. 4 is a flow chart of an operation instruction process performed by the moving object operation management device according to the embodiment in view of an exclusive section.

The management device 12 is adapted to take action to address the above-mentioned problems caused by the adjacent exclusive section E. Specifically, an operation instruction process shown in a flow chart in FIG. 4 is performed on the target transport machine Ts as the target transport machine Ts when one of the two adjacent working transport machines T that finished the work first. Hereinafter, the operation instruction processing will be described in accordance with the flowchart. In this description, the situation shown in FIG. 3B is assumed. More specifically, the self-exclusive section Es is set for the target transport machine Ts. Assuming that the adjacent work transport machine Tn is working at a place adjacent to the target transport machine Ts, and the adjacent exclusive section En is set for the adjacent work transport machine Tn.

The operation instruction process is executed when the target transport machine Ts finishes the load work or the unload work and the target transport machine Ts attempts to move to the next destination. In this operation instruction process, first, Step 1 (hereinafter, abbreviated as "S1" is used). The other steps are similar. The shortest path is identified, and it is determined in S2 whether the movement of the target transport machine Ts to the next destination in the shortest path is hindered by the adjacent exclusive section En. In a case where the movement on the shortest path is not hindered, that is, in a case where the shortest path is a path toward the opposite direction to the adjacent exclusive section En (in this case, a path indicated by a broken line in FIG. 3B is the shortest path), the setting of the self-exclusive section Es is released in S3, and an instruction to move by the shortest path is sent to the target transport machine Ts.

When the movement of the target transport machine Ts on the shortest path is hindered, that is, when the shortest path is a path passing through the adjacent exclusive section En, a detour path bypassing the adjacent exclusive section En, that is, a path toward the opposite direction to the adjacent exclusive section En is specified in S4. In S5, a detour arrival time t1 which is a time at which the target transport machine Ts moves on the detour path and arrives at the next destination, that is, the first arrival time, is calculated.

Figure 5A:
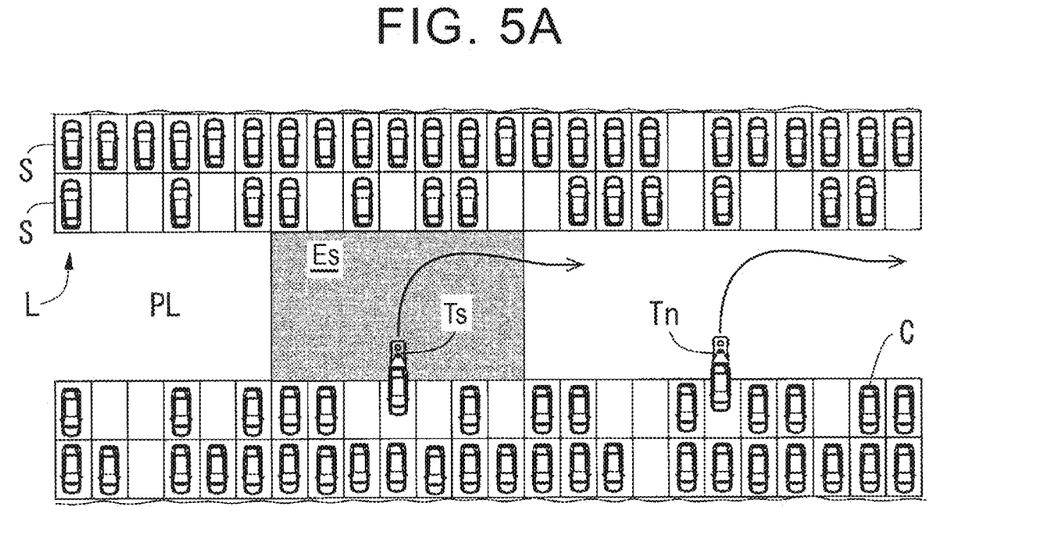
FIG. 5A is a diagram for explaining a standby instruction and a retreat instruction which are second operation instructions.

In the following S6, it is determined whether or not the movement of the adjacent work transport machine Tn in the shortest path to the next destination is hindered by the self-exclusive section Es. In other words, when the adjacent work transport machine Tn moves on the shortest path toward the next destination, it is determined whether or not it passes through the section set as the self-exclusive section Es or the self-exclusive section Es. If it is not hindered (in this case, the path indicated by the dashed line in FIG. 3B is the shortest path of the adjacent work transport machine Tn), the standby mode is selected as the operation mode in S7. As illustrated in FIG. 5A, in the standby mode, the target transport machine Ts stands by in the self-exclusive section Es. After the adjacent work transport machine Tn finishes the work and moves to the next destination on the shortest path, that is, after the setting of the adjacent exclusive section En is cancelled, the target transport machine Ts moves to the next destination on its shortest path.

When it is determined in S6 that the movement of the adjacent work transport machine Tn on the shortest path to the next destination is hindered by the self-exclusive section Es, in the vicinity of the target transport machine Ts, in particular, in a section excluding the adjacent exclusive section En of the transverse passage PL in which the target transport machine Ts is present, it is determined in S8 whether there is a space for the target transport machine Ts to retreat, that is, a retreat space. The retreat space is a space in which the transport vehicle T in a state where the vehicle C is not transported or the vehicle C is transported can stay in a state where the transport vehicle T does not protrude to the passage P. As indicated by reference numeral X in FIG. 5B, for example, two consecutive storage sections S can be used as the retreat space.

Figure 5B:
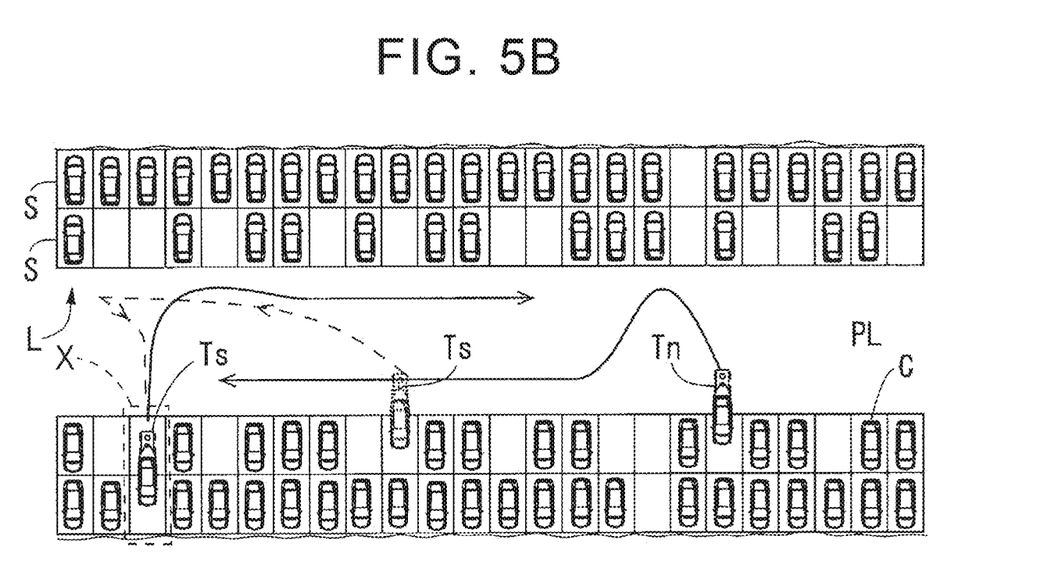
FIG. 5B is another diagram for explaining the standby instruction and the retreat instruction which are the second operation instructions.

If there is no retreat space, the standby mode is selected as the operation mode in S7. Incidentally, in this case, when the work is completed and the adjacent work transport machine Tn moves to the next destination, an instruction to move to the next destination by a path that does not pass through the self-exclusive section Es, that is, a detour path instead of the shortest path. When the retreat space X is present, the retreat mode is selected as the operation mode in S9. In this retreat mode, as shown in FIG. 5B, once the target transport machine Ts retreats in the retreat space X after the work is finished, the setting of the self-exclusive section Es is canceled. After the adjacent work transport machine Tn that has completed the work passes through the section that was the self-exclusive section Es on the shortest path, the target transport machine Ts passes through the section in which the setting of the adjacent exclusive section En has been cancelled, and moves to the next destination by its shortest path.

Even when any of the standby mode and the retreat mode is selected, in S10, the arrival time of the target transport machine Ts to the next destination, that is, the shortest path arrival time t2 which is the second arrival time is calculated. The shortest path arrival time t2 is simply calculated as the time obtained by adding the time of waiting in the self-exclusive section Es to the time of arriving at the next destination on the shortest path when the movement is not obstructed when the standby mode is selected. When the retreat mode is selected, it is calculated as the time obtained by adding the time during which the target transport machine Ts retreats in the retreat space X to the time at which the vehicle arrives at the next destination by the shortest path when the movement is not hindered. In other words, the shortest path arrival time t2 can be considered to be the estimated time based on the time at which the work of the adjacent work transport machine Tn in the adjacent exclusive section En is estimated to be finished.

Subsequently, in S11, the bypass arrival time t1 calculated in S5 is compared with the shortest path arrival time t2 calculated in S10. When the detour arrival time t1 is closer to the current time point than the shortest path arrival time t2, that is, when it is determined that it arrives earlier in the detour path without waiting or retreating, S12 issues, as the first operation instruction, an instruction to the target transport machine Ts to the next destination on the detour path. On the other hand, when the shortest path arrival time t2 and the detour time t1 are equal or the shortest path arrival time t2 is closer to the present time than the detour time t1, that is, when it is determined that the path arrives later toward the next destination on the detour path, as the second operation instruction, the selected operation mode, that is, the standby mode or the instruction adapted to the retreat mode is issued to the target transport machine Ts in S13. When an instruction suitable for the standby mode is issued, as described above, an instruction is also issued to the adjacent work transport machine Tn as to which one of the shortest path and the detour path is to be directed to the next destination.

As described above, according to the management device 12 of the present embodiment, even when movement of the moving object in the shortest path to the next destination is hindered by the exclusive section, appropriate operation management of the moving object becomes possible. In particular, it is possible to appropriately avoid the deadlock even when a deadlock occurs between two moving objects.

Note that, when it is determined that the movement of the adjacent work transport machine Tn on the shortest path to the next destination is hindered by the self-exclusive section Es, the instruction when the retreat mode is selected due to the presence of the retreat space of the target transport machine Ts is considered to be the second operation instruction. An instruction when the standby mode is selected without the presence of the retreat space, that is, an instruction to cause the target transport machine Ts to wait in the self-exclusive section Es, move the adjacent work transport machine Tn to move to the next destination by bypassing the self-exclusive section Es, and then move the target transport machine Ts to the next destination by the shortest path, can be considered to be a third operation instruction that is an alternative to the second operation instruction.

What is claimed is:

1. A moving object operation management device that manages operation of a plurality of moving objects configured to move in a passage provided in an area and perform work at a specific place, the moving object operation management device being configured to when the work of a certain moving object hinders movement of another moving object in the passage, set a section including the place where the work is performed as an exclusive section, and when the exclusive section for one of two moving objects and the exclusive section for the other moving object are adjacent to each other and movement of the one moving object to a next destination by a shortest path is hindered by the exclusive section for the other moving object, selectively generate a first operation instruction and a second operation instruction by comparing an arrival time of the one moving object at the next destination between the first operation instruction and the second operation instruction, the first operation instruction being an instruction to move the one moving object to the next destination by a path bypassing the exclusive section for the other moving object, and the second operation instruction being an instruction to move the one moving object to the next destination by the shortest path after the exclusive section for the other moving object is cancelled, wherein the second operation instruction is an instruction to cause the one moving object to wait in the exclusive section for the one moving object, and move to the next destination by the shortest path after the other moving object moves toward a next destination without passing through the exclusive section for the one moving object.

2. The moving object operation management device according to claim 1, wherein the moving object operation management device is configured to, when generating the second operation instruction when movement of the other moving object to the next destination by a shortest path is not hindered by the exclusive section for the one moving object, generate an instruction to move the other moving object to the next destination by the shortest path.

3. The moving object operation management device according to claim 1, wherein the moving object operation management device is configured to, when generating the second operation instruction when movement of the other moving object to the next destination by a shortest path is hindered by the exclusive section for the one moving object, generate an instruction to move the other moving object to the next destination by bypassing the exclusive section for the one moving object.

4. The moving object operation management device according to claim 1, wherein the moving object operation management device is configured to determine the arrival time at the next destination by Dijkstra's algorithm in graph theory.

5. The moving object operation management device according to claim 1, wherein the moving object operation management device is configured to, when generating the second operation instruction, estimate an end time of the work of the other moving object in the exclusive section for the other moving object and estimate the arrival time of the one moving object at the next destination according to the second operation instruction.

* * * * *